Aug. 7, 1951 R. A. MULLANEY 2,563,546

RECORD-PLAYING ADAPTER

Filed Jan. 27, 1950 2 Sheets-Sheet 1

RALPH A. MULLANEY
*INVENTOR.*

BY Francis W. Crotty
HIS ATTORNEY

Aug. 7, 1951

R. A. MULLANEY 2,563,546

RECORD-PLAYING ADAPTER

Filed Jan. 27, 1950

2 Sheets-Sheet 2

RALPH A. MULLANEY
*INVENTOR.*

BY Francis W. Crotty
HIS ATTORNEY

Patented Aug. 7, 1951 2,563,546

UNITED STATES PATENT OFFICE 2,563,546

RECORD-PLAYING ADAPTER

Ralph A. Mullaney, Elmwood Park, Ill., assignor to Zenith Radio Corporation, a corporation of Illinois Application January 27, 1950, Serial No. 140,926

15 Claims. (Cl. 274—9)

This invention relates to a novel record-playing adapter and more particularly to one utilized in conjunction with an existing record player or record changer to be driven therefrom at a selected speed which is different from that of the driving record player.

Over a period of many years, manufacturers of disc recordings have processed records adapted to be reproduced at a rotational speed of 78 revolutions per minute (R. P. M.). For playing such records, phonographs were manufactured which included turntables operable solely at this rotational speed. Through a period of years, during which recorded entertainment enjoyed extended popularity, a great number of these record-playing devices were marketed and are presently in use but, unless modified or equipped with a suitable adapter, they are not able to take advantage of the present trend towards recordings which are to be played at a lower speed than 78 R. P. M.

In connection with such lower speeds, it is well known that increased playing time for a record disc of given diameter may be realized through the use of a recording speed which is less than the conventional 78 R. P. M. Also, by a concurrent reduction in the width of the sound groove, adjacent turns of the spiral may be spaced closer together and thus make possible a further increase in playing time. Considerable speed alone, by reducing the recording speed to 16.6 R. P. M., the playing time of a given record disc may be increased over four and one-half times that afforded at 78 R. P. M.

It is contemplated that slow-speed recordings will be prepared to take advantage of increased playing time per disc. In particular, these recordings are to have various literary works recorded at a speed of 16.6 R. P. M. for use by persons who are blind, and it has been found that even though this relatively low speed is employed the fidelity of such record discs is entirely suitable for reproduction of the human voice.

Thus, it is apparent that a need has arisen for an adapter unit to permit phonograph equipment designed only for the playing of 78 R. P. M. recordings to accommodate the lower-speed record discs. For convenience and economy, such an adapter unit should be operable with a minimum of alterations to the existing record player and preferably should utilize the existing tone arm. Also, in order that such an adapter unit may be commercially feasible, it should be relatively simple to construct and inexpensive to market.

It is an object of this invention, therefore, to provide a novel record-playing adapter for use in conjunction with a record player to rotate a record disc at a preselected rotational speed different from that of the record player.

It is a further object of this invention to provide an adapter for a record player having a turntable rotatable at a first speed which provides the motive power for rotating a record disc at a second rotational speed.

It is a still further object of this invention to provide a record-playing adapter which is simple to construct and inexpensive to market.

In accordance with the present invention, the record-playing adapter for a center-spindle turntable comprises a support member which has a central aperture for receiving a spindle to position the support member coaxially with a turntable. A plurality of similar driving gears are rotatably supported by the support member at equal radial distances from the aperture thereof and are positioned in planes normal to that of the support member for engagement with a turntable accommodating the adapter. A plurality of similar driven gears which have a smaller diameter than the driving gears are rotatably supported by the support member at equal radial distances from the aperture thereof and are mechanically coupled to the driving gears for rotation therewith. The adapter includes a stationary member for engagement with the peripheral surfaces of the driven gears. The adapter further includes locking means coupled to the stationary member for engagement with a non-rotatable element associated with a turntable accommodating the adapter to lock the stationary member against rotation. There are provided means, mechanically coupled to the support member, for carrying a record disc in a plane that is substantially parallel to that of the support member and is spaced from the gears and the stationary member.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figures 1, 2:
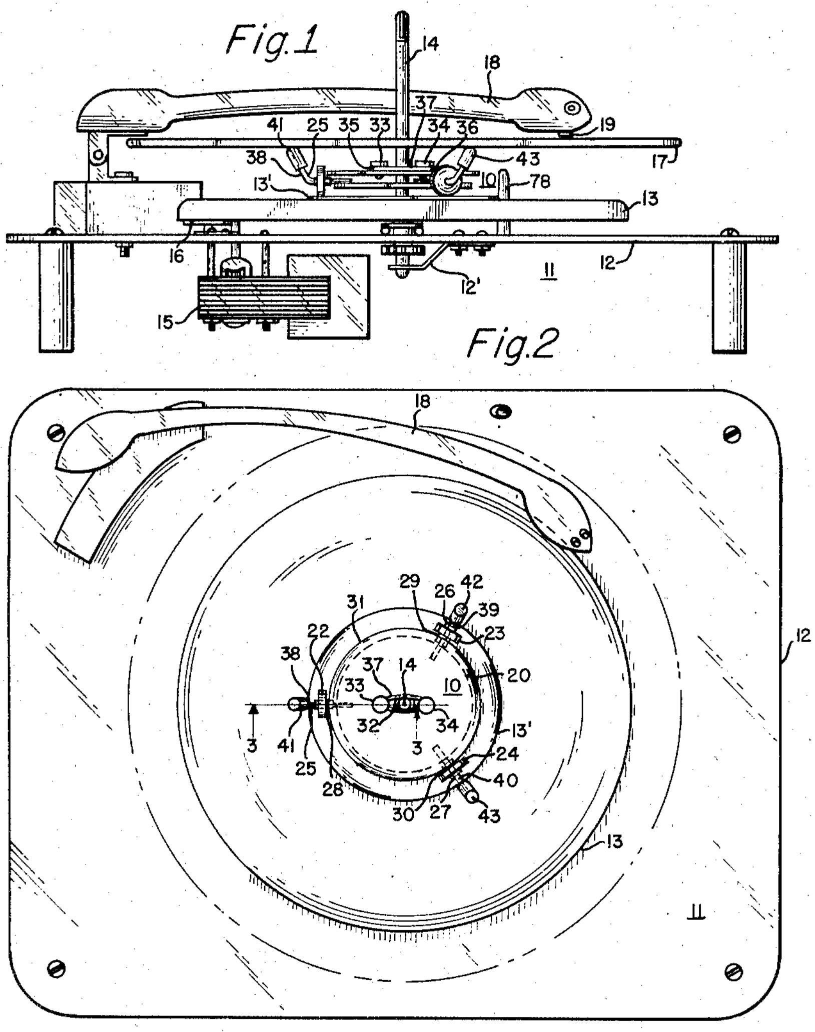
Fig. 1 shows a side view of a record-playing adapter embodying the present invention in operating position on a conventional record player.
Fig. 2 is a plan view of the arrangement of Fig. 1.

Referring to Fig. 1, the record-playing adapter 10 is positioned on a conventional record player 11 which includes a mounting member 12, a turntable 13 and a spindle 14 projecting vertically through the center of the turntable. In this illustration, spindle 14 is of the non-rotatable type, being secured to base 12 by a bracket 12'. A driving motor 15 is coupled to turntable 13 by an idler gear 16. Adapter 10 rests on turntable 13 and carries a record disc 17. The tone arm 18 of phonograph 11 includes a transducer and stylus element 19 shown to be tracking in the grooves of the record 17. The record player 11 is of conventional construction and a detailed discussion thereof is deemed unnecessary.

Figure 3:
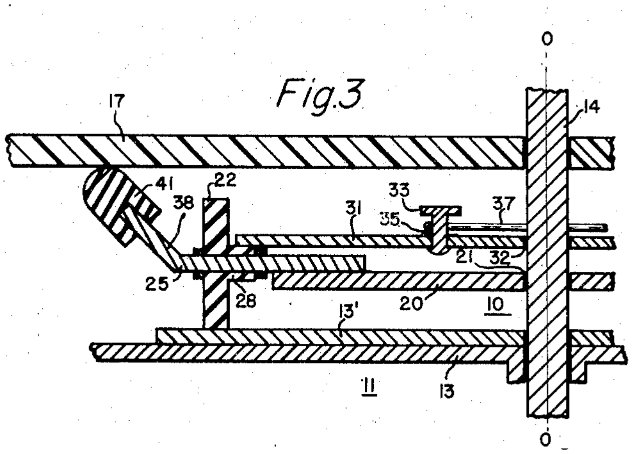
Fig. 3 is a cross-sectional view taken along lines 3—3 of Fig. 2.

In Fig. 3 an enlarged cross-sectional view of a portion of the record-playing adapter 10 shows this structure to include a support member 20 which has a central aperture 21 for receiving spindle 14 to position support member 20 coaxially with respect to turntable 13. As shown in Fig. 2, member 20 is disc-shaped and a plurality of similar driving gears 22, 23 and 24 are rotatably supported on one of the shafts 25, 26 and 27 which are affixed thereto. The shafts 25, 26 and 27 are disposed radially on disc member 20 and define equal arcs about the periphery thereof. The gears 22, 23 and 24 are positioned in planes normal to that of member 20 for engagement with turntable 13. An optional bearing disc 13' may be disposed atop turntable 13 to provide a smooth surface over the usually rough, flocked surface thereof.

A plurality of similar driven gears 28, 29 and 30, which have a smaller diameter than the driving gears 22, 23 and 24, are rotatably supported by member 20 on respective ones of the shafts 25, 26 and 27. The driven gears are positioned at equal radial distances from aperture 21 of member 20, but their radial spacing is less than that of the driving gears. As more clearly shown in Fig. 3, each driven gear may be formed integrally with its respective driving gear. Hence, each of the driven gears 28, 29 and 30 is thereby directly coupled to a respective one of the driving gears 22, 23 and 24 for rotation therewith. The gears preferably are formed of a resilient material, however, any suitable material may be employed which provides a frictional driving surface at the peripheries of the several gears.

A stationary member 31 includes a central aperture 32 for receiving spindle 14 to position member 31 coaxially with respect to turntable 13. Member 31 engages the upper portions of the peripheral surfaces of driven gears 28, 29 and 30 and, as shown in Fig. 2, is disc-shaped.

Locking means coupled to the stationary member 31 are adapted to engage non-rotatable spindle 14 associated with turntable 13 to lock this stationary element against rotation. The locking means comprises a pair of rivets 33 and 34 (Fig. 2) supported on member 31 at opposite sides of opening 32. Each rivet includes an elongated body portion 35, 36 which has a diameter smaller than that of spindle 14 and which projects above the upper surface of member 31. A hair-pin shaped resilient wire 37 encircles body portions 35 and 36 and is disposed over opening 32 of member 31. The spacing between adjacent sides of the hair-pin loop is less than the diameter of spindle 14 and slightly greater than the diameter of body portions 35 and 36. Hence, when member 31 is positioned relative to spindle 14, the sides of the hair-pin loop operate as a spindle-clamp to firmly grasp spindle 14 and lock member 31 against rotation. At the same time, since the body portions of the rivets are elongated, a small degree of movement in a vertical direction is permitted for member 31.

Each of the shafts 25, 26 and 27 is provided with an extension designated 38, 39 and 40. Portions 38, 39 and 40 extend away from the gears 22, 23 and 24 and upwardly away from the plane of support member 20. Each of the shaft continuations 38, 39 and 40 carries one of the resilient bearing members or cushions 41, 42 and 43. The cushions, rods and shafts constitute means, mechanically coupled to support member 20, for carrying record disc 17 in a plane that is substantially parallel to that of support member 20 and is spaced above the gears 22, 23 and 24 and stationary member 31. With reference again to Fig. 3, it may be seen that cushion 41, rod 38 and shaft 25 form one of a plurality of record-disc carrying arms affixed at one extremity to support member 20. This carrying arm, so defined, includes a portion (shaft 25) coaxially aligned with a respective one (22) of the driving gears to constitute a journal therefor.

In order to associate the adapter operatively with the record changer 10 to permit that changer to transcribe recordings at a lower speed than its single driving rate, the adapter is placed upon the turntable 13 with the spindle 14 projecting through apertures 21 and 32 of members 20 and 31, respectively, as shown in the drawings. With the adapter in position, the driving gears 22, 23 and 24 are in frictional driving engagement with disc 13' and are coupled with turntable 13 for rotation therewith. The stationary member 31 rests upon the peripheral portions of the driven gears 28, 29 and 30 and is locked against rotation by spring clip 37. A record disc 17 may be threaded over the spindle 14 to rest upon pads 41, 42 and 43.

When turntable 13 is rotatably driven, driving wheels 22, 23 and 24 rotate about spindle 14. This occurs since stationary member 31 is locked against rotation and the driven gears 28, 29 and 30 roll on the underside thereof. It may be generally stated that the rotational speed with which the driving gears carry support member 20 is dependent upon the diameters of the driving gears and the driven gears, their radial spacing from spindle 14, and the speed of turntable 13.

Figure 4:
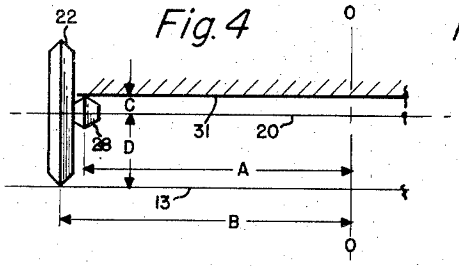
Fig. 4 is a functional representation of Fig. 3.

The simplified representation of Fig. 4 shows the driving gear 22 and the driven gear 28 as having relatively narrow peripheral surfaces as compared with the representation of Fig. 3. This configuration facilitates the explanation of the speed relationships.

Assume for the sake of illustration that the gears 22 and 28 are disposed in a common plane normal to member 20. The peripheral velocity W of turntable 13 at the point of contact with idler 22 is expressed as follows:

$$W = \alpha_1 2R\pi \qquad (1)$$

where R is the radial distance of the gears from the axis of rotation 0 of turntable 13 and $\alpha_1$ is the rotational speed of turntable 13. If the radius of the driven gear is C and the radius of the driving gear is D then at any particular instant the lever C+D pivots about one end thereof on stationary surface 31. The peripheral velocity X of the axis of rotation of gears 22 and 28 relative to the peripheral velocity of turntable 13, both velocities taken at points equidistant from the axis 0 of turntable 13, is:

$$X = \left(\frac{C}{C+D}\right) \qquad (2)$$

Equation 1 multiplied by Equation 2 yields:

$$WX = \alpha_1 2R\pi\left(\frac{C}{C+D}\right) \qquad (3)$$

Since the rotational speed $\alpha_2$ of gears 22 and 28 about axis 0 may be expressed as:

$$\alpha_2 = \frac{WX}{2R\pi} \qquad (4)$$

combining this relationship with Equation 3, the rotational speed of the axes of gears 22 and 28, which defines the rotational speed of member 20, is:

$$\alpha_2 = \frac{\alpha_1 2R\pi\left(\frac{C}{C+D}\right)}{2R\pi} = \alpha_1\left(\frac{C}{C+D}\right) \qquad (5)$$

In the arrangement of the invention, the gears 22 and 28 are not in the same plane, gear 22 being spaced from axis 0 by a radial distance B and gear 28 being spaced from axis 0 by a radial distance A, which is smaller than B. Equation 5 when applied to this case becomes:

$$\alpha_2 = \alpha_1\left(\frac{C}{C+D}\right)\frac{B}{A} \qquad (6)$$

Thus, the rotational speed of support member 20 is dependent upon the relationship expressed in the Equation 6. By constructing the record-playing adapter with predetermined dimensions for driving gears 22, 23 and 24 and driven gears 28, 29 and 30 and properly adjusting their distances from the axis of rotation of turntable 13, the rotational speed of member 20 may be established at a predetermined fraction of the rotational speed of turntable 13. Since the record-carrying members 41, 42 and 43 rotate with member 20, it follows that the rotational speed of this element is imparted to record disc 17. In the limiting case where the diameters of the driven and driving gears are equal, member 20 rotates at one-half the speed of turntable 13 if the distances B and A are equal.

Figure 5:
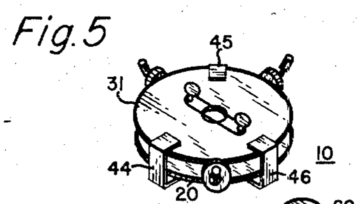
Fig. 5 is an oblique view of a modification of the present invention.

In the modification of Fig. 5 there is provided means for retaining the discs 20 and 31 in a substantially coaxial position when the adapter 10 is removed from record player 11. This includes three flexible U-shaped brackets 44, 45 and 46 which are affixed to the under side of support member 20 at points intermediate shafts 25, 26 and 27. The retaining members extend upwardly beyond stationary member 31 and portions thereof are disposed over the top of that member. In assembling this arrangement, the members 44, 45 and 46 are bent outwardly to receive disc 31 and are then returned to their normal positions in which they extend over and above member 31, permitting rotation of member 20 relative to member 31. Elements 44, 45 and 46 prevent any material lateral displacement of member 31 as might otherwise occur when adapter 10 is tipped or overturned or removed from its operating position on the turntable 13.

Figures 6, 8:
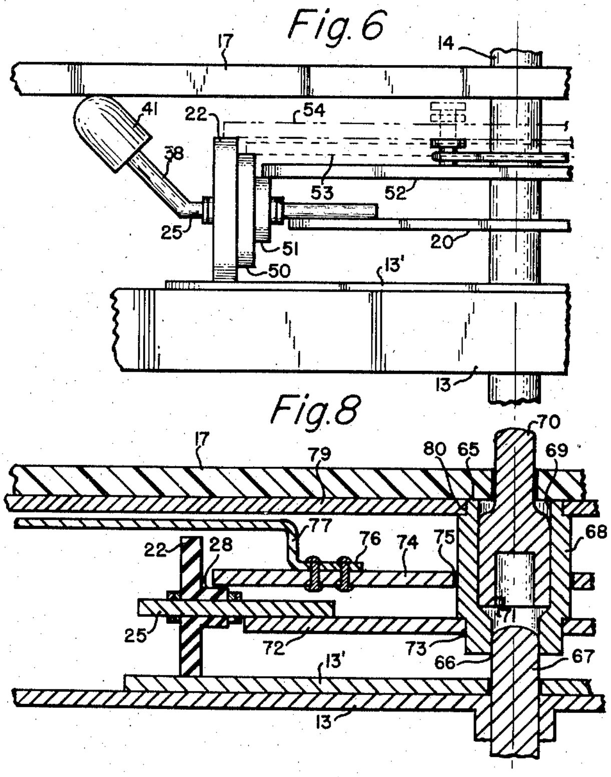
Fig. 6 shows a record-playing adapter embodying a modification of the present invention, portions thereof being shown broken away.
Fig. 8 is a cross-sectional view of a portion of a record-playing adapter embodying still another modification of the invention.

The modified arrangement of Fig. 6 is somewhat similar to the structure of Figs. 1, 2 and 3 and like elements are designated by identical reference numerals. In this embodiment a plurality of similar families of driven gears is provided, each being coupled to a respective driving gear. To simplify the drawing, the fragmentary view of Fig. 6 shows only one of these gear families. This family includes two driven gears 50 and 51 of different diameters individually having a smaller diameter than driving gear 22 and mechanically coupled thereto for rotation therewith. In this case a stationary member 52 is shown in engagement with the peripheral surface of driven gear 51 to derive a particular record speed. If a different speed is required, another stationary member 53 shown in dotted lines replaces member 52 and is positioned in engagement with the peripheral surface of driven gear 50. Still another stationary member 54 shown in dotted lines is utilized for a third speed and engages the peripheral surface of driving gear 22.

Referring to the afore-going Equation 6, it may be seen that the rotational speed of member 20 is dependent upon the diameter of the effective driven gears. Hence, when stationary member 52 is employed, the rotational speed of member 20 has a certain low value; when stationary member 53 is used, the rotational speed of member 20 has another greater value; and when stationary member 54 is used, in the limiting case, the rotational speed of member 20 is still greater and is approximately equal to one-half the rotational speed of turntable 13. Although a three speed system has been described, it is to be understood that more than three selected rotational speeds may be provided for a record disc.

Figure 7:
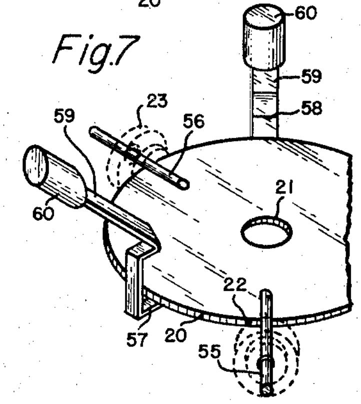
Fig. 7 is an oblique view of a portion of a record-playing adapter embodying another modification of the invention.

In the modified arrangement of Fig. 7, the supporting member 20 includes a plurality of shafts 55, 56 and a third shaft which is not shown. These shafts are affixed to member 20 in such a manner that the driving gears 22, 23 and 24 may be spaced at equal distances along a circle which is coaxial with the aperture 21 of member 20. Instead of utilizing extensions of the several shafts for carrying a record disc, as in the arrangement of Fig. 4, a plurality of record-disc carrying arms are affixed to support member 20. Two of these arms 57 and 58 are illustrated, and a third is not shown. Arm 57 is disposed between shafts 55 and 56 and extends between adjacent ones of the gear families journaled on the shafts, the others being similarly arranged on member 20. The record-disc carrying arms are generally U-shaped and serve to retain the stationary member (not shown) of the adapter in an operating assembly with rotatable member 20 in a manner similar to that described in connection with arms 44, 45 and 46 of the arrangement of Fig. 3. Each such arm includes an extension 59 which carries the record pad 60.

The modified arrangement of Fig. 8 is generally similar to that of Fig. 3 and is particularly suited for use in connection with a record player in which the spindle rotates with the turntable. It is apparent that for such a record player some means other than the spindle must be employed for locking member 31 against rotation. A cylindrical bushing 65 is included in the adapter assembly, having a reduced internal diameter at one end 66 for receiving the rotatable spindle 67 associated with turntable 13 and accommodating at the opposite end a removable record-centering pin 70. The end of centering pin 70 received by bushing 65 may be recessed effectively to constitute an extension of the reduced-diameter section 66 of the bushing so that the adapter may be operatively associated with turntables having different spindle heights.

A support member 72 which has a central opening 73 is affixed to the lower extremity of the bushing for rotation therewith. A stationary member 74 has a central aperture 75 journaled for rotation on the outer surface 68 of bushing 65.

A locking arm 76 is mechanically connected to member 74, and has an S-shaped bend 77 in order that it may clear the driving gears. This arm furnishes the locking means for engagement with a non-rotatable element associated with turntable 13 to keep member 74 fixed against rotation. Arm 71 is of sufficient length to engage a tone arm rest 78 or any other stationary component of the record player 11 to which the arm may conveniently be anchored.

A disc-shaped record-carrying member 79 is affixed to the top portion of bushing 65 and is arranged to carry a record disc in a plane that is substantially parallel to that of support member 72 and is spaced from the gears, the stationary member 74 and arm 76.

The operation of the embodiment of Fig. 8 is generally similar to that described in connection with Figs. 1 through 4 with the exception of the means for locking member 74 against rotation. Since support member 72 and record-carrying member 79 are affixed to bushing 65, rotation of member 72 is imparted to any record disc 17 supported upon member 79.

Figure 9:
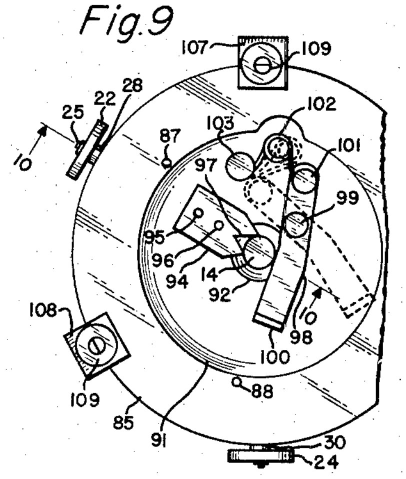
Fig. 9 is a plan view of yet another modification of the invention, portions thereof being shown broken away; and, Fig. 10 is a cross-sectional view taken along lines 10—10 of Fig. 9.
Figure 10:
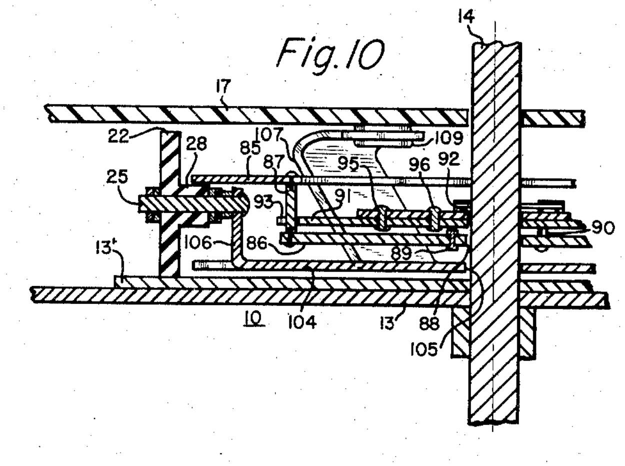

Figs. 9 and 10 represent an arrangement which includes a modified spindle-clamping structure. The stationary member comprises a flat annular portion 85, in engagement with the peripheral surfaces of the driven gears, affixed to a disc portion 86 by three elongated pins, one of which 87 is shown. The head of another pin 88 appears in Fig. 9. The pins are equally spaced about the periphery of disc 86 and maintain portions 85 and 86 in spaced parallel planes, with disc 86 below the plane of portion 85. Disc 86 includes a central aperture 88 through which spindle 14 projects. Three bearing pins, secured to disc 86, are equally spaced about aperture 88 and project slightly above the upper surface of the disc. Two of these pins 89 and 90 are shown, a third is not shown.

A disc 91 which has a central aperture 92 of a diameter somewhat larger than that of spindle 14 rests on the tips of the bearing pins, being positioned between the planes of portions 85 and 86 of the stationary member. Disc 91 is larger in diameter than disc 86 and a series of three peripheral slots loosely receive the three elongated pins which mechanically connect the members 85 and 86. One of these slots 93 is illustrated, the other two are not shown. The slot configuration is such that disc 91 is freely movable in a vertical direction and yet is mechanically coupled to the stationary member 85, 86 with respect to the plane of portion 85.

A member 94 is secured to disc 91 by a pair of rivets 95 and 96 and includes a toothed or serrated portion 97 positioned above opening 92 for engaging spindle 14. A clamping lever 98 is supported for rotational movement on a pivot 99 positioned intermediate the lever ends. A control handle 100 is provided at one end of lever 98 and a spring support 101 is positioned at the other end. A toggle spring 102 extends between support 101 and a terminal 103 mounted on disc 91. The toggle spring 102 biases lever 98 in a clockwise direction (looking at the plane of Fig. 9) into engagement with spindle 14 to firmly wedge the spindle against the toothed surface of member 94. When the lever 98 is in the position shown in dotted lines, the spring biases it in the opposite direction.

A disc-shaped support member 104 is disposed below disc 86 and includes a central aperture 105 and three upturned lugs are spaced about the periphery thereof. Two of these lugs are not shown, the third 106, which is representative of the others, carries the shaft 25 on which driving gear 22 and driver gear 28 are rotatably mounted. Three record disc carrying arms are integrally formed with member 104. Two of these arms 107 and 108 are illustrated, the third is not shown. The arms are disposed between successive gears about the periphery of disc 104. The arms are generally U-shaped and are similar in function to arms such as 57 and 58 of the embodiment shown in Fig. 7. Each such arm carries a grommet or record pad 109.

The adapter of Figs. 9 and 10 is associated with the record player 10 like the one of Figs. 1 through 4. Prior to the placing of the adapter, lever 98 is rotated to the position shown in dotted lines. The adapter then is positioned on turntable 13 with the spindle 14 projecting through apertures 88, 92 and 105 of members 86, 91 and 104, respectively as shown in Fig. 9. Lever 98 next is rotated in a clockwise direction to the full-line position and spindle 14 is clamped between the lever and the toothed portion 97 of member 94. Thus, stationary member 85, 86 is locked against rotation. However, as pointed out above, disc 91 and member 85, 86 are relatively movable in a vertical direction and any irregularities in the various driving and driven surfaces may be compensated to minimize rumble.

The adapter in accordance with the invention includes a gear system which has a plurality of similar driving gears. The stationary member is arranged to engage the peripheral surfaces of gears included in the gear system. In particular, with reference to Fig. 6, stationary member 54 engages the peripheral surface of driving gear 22 which is included in the gear system of the adapter.

The record-playing adapter of the present invention is a very simply constructed and inexpensive structure and is easily placed in operative association with an existing record player without requiring any significant structural changes in the record player. Motive power for a record disc positioned upon the adapter is derived from the existing turntable and the tone arm normally associated with the turntable may be employed in playing the record.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member in engagement with the peripheral surfaces of said driven gears; locking means coupled to said stationary member for engagement with a non-rotatable element associated with a turntable accommodating said adapter to lock said stationary member against rotation; and means mechanically coupled to said support member for carrying a record disc in a plane that is substantially parallel to that of said support member and is spaced from said gears and said stationary member.

2. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears rotatably supported by said member at equal radial distances from said aperture, having a smaller diameter and radial distance than said driving gears, and mechanically coupled to said driving gears for rotation therewith; a stationary member in engagement with the peripheral surfaces of said driven gears; locking means coupled to said stationary member for engagement with a non-rotatable element associated with a turntable accommodating said adapter to lock said stationary member against rotation; and means mechanically coupled to said support member for carrying a record disc in a plane that is substantially parallel to that of said support member and is spaced from said gears and said stationary member.

3. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, disposed at equal radial distances from said aperture of said member, and individually connected in coaxial alignment with respective ones of said driving gears for rotation therewith; a stationary member in engagement with the peripheral surfaces of said driven gears; locking means coupled to said stationary member for engagement with a non-rotatable element associated with a turntable accommodating said adapter to lock said stationary member against rotation; and means mechanically coupled to said support member for carrying a record disc in a plane that is substantially parallel to that of said support member and is spaced from said gears and said stationary member.

4. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a disc-shaped stationary member, in engagement with the peripheral surfaces of said driven gears and having a central aperture for receiving a spindle to position the stationary member coaxially with a turntable; locking means coupled to said stationary member for engagement with a non-rotatable element associated with a turntable accommodating said adapter to lock said stationary member against rotation; and means mechanically coupled to said support member for carrying a record disc in a plane that is substantially parallel to that of said support member and is spaced from said gears and said stationary member.

5. A record-playing speed-reducing adapter for a turntable of the non-rotatable central-spindle type comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member in engagement with the peripheral surfaces of said driven gears; locking means coupled to said stationary member and including a spindle-clamping portion for engagement with a non-rotatable central spindle associated with a turntable accommodating said adapter to lock said stationary member against rotation; and means mechanically coupled to said support member for carrying a record disc in a plane that is substantially parallel to that of said support member and is spaced from said gears and said stationary member.

6. A record-playing speed-reducing adapter for a center-spindle type turntable rotatably supported on a non-rotatable mounting base comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member in engagement with the peripheral surfaces of said driven gears; a locking arm affixed at one end to said stationary member and extending therefrom for engagement with a stationary member associated with a turntable accommodating said adapter to lock said stationary member against rotation; and means mechanically coupled to said support member for carrying a record disc in a plane that is substantially parallel to that of said support member and is spaced from said locking arm, said gears and said stationary member.

7. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member in engagement with the peripheral surfaces of said driven gears; locking means coupled to said stationary member for engagement with a non-rotatable element associated with a turntable accommodating said adapter to lock said stationary member against rotation; and a plurality of record disc carrying arms affixed at one extremity to said support member and extending to a plane that is substantially parallel to that of said support member and is spaced from said gears and said stationary member.

8. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member in engagement with the peripheral surfaces of said driven gears; locking means coupled to said stationary member for engagement with a non-rotatable element associated with a turntable accommodating said adapter to lock said stationary member against rotation; and a plurality of record-disc carrying arms affixed at one extremity to said support member and extending to a plane that is substantially parallel to that of said support member and is spaced from said gears and said stationary member, each of said carrying arms including a portion coaxially aligned with a respective one of said driving gears to constitute a journal therefor.

9. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture, and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member for engagement with the peripheral surfaces of said driven gears; locking means coupled to said stationary member for engagement with a non-rotatable element associated with a turntable accommodating said adapter to lock said stationary member against rotation; and a plurality of record disc carrying arms affixed at one extremity to said support member and extending between adjacent ones of said driving gears to a plane that is substantially parallel to that of said support member and is spaced from said gears and said stationary member.

10. A record-playing speed-reducing adapter for a center-spindle turntable comprising: a bushing having a centering-opening for receiving a spindle associated with a turntable; a support member having a central aperture coaxially aligned with said opening of said bushing and mounted for rotation with said bushing; a plurality of similar driving gears rotatably supported by said member at equal radial distances from said aperture thereof and positioned in planes normal to that of said member for engagement with a turntable accommodating said adapter; a plurality of similar driven gears having a smaller diameter than said driving gears, rotatably supported by said member at equal radial distances from said aperture thereof, and mechanically coupled to said driving gears for rotation therewith; a stationary member, supported for rotation relative to said bushing in engagement with the peripheral surfaces of said driven gears; locking means coupled to said stationary member for engagement with a non-rotatable element associated with a turntable accommodating said adapter to lock said stationary member against rotation; and a record disc carrying member affixed to said bushing for carrying a record disc in a plane that is substantially parallel to that of said support member and is spaced from said gears and said stationary member.

11. A record-playing speed-reducing adapter for a center-spindle turntable comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar families of driven gears rotatably supported by said member at equal radial distances from said aperture thereof, each of said families mechanically coupled to one of said driving gears for rotation therewith and including a plurality of gears of different diameters all of which are smaller than said driving gears; at least one stationary member in engagement with the peripheral surfaces of gears included in a group of preselected similar ones of said families of driven gears; locking means coupled to said stationary member for engagement with a non-rotatable element associated with a turntable accommodating said adapter to lock said stationary member against rotation; and means mechanically coupled to said support member for carrying a record disc in a plane that is substantially parallel to that of said support member and is spaced from said gears and said stationary member.

12. A record-playing speed-reducing adapter for a center-spindle turntable comprising: a support member having a central aperture for receiving a spindle to position the support member coaxially with a turntable; a gear system including a plurality of similar driving gears rotatably supported by said member at equal radial distances from said aperture and positioned in planes normal to that of said member for engagement with a turntable accommodating said adapter; a stationary member for engagement with the peripheral surfaces of gears included in said gear system; locking means coupled to said stationary member for engagement with a non-rotatable element associated with a turntable accommodating said adapter to lock said stationary member against rotation; and means mechanically coupled to said support member for carrying a record disc in a plane that is substantially parallel to that of said support member and is spaced from said gears and said stationary member.

13. A record-playing speed-reducing adapter for a turntable of the non-rotatable central-spindle type comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member in engagement with the peripheral surfaces of said driven gears; spindle-clamping means coupled to said stationary member for engagement with a non-rotatable central spindle associated with a turntable accommodating said adapter to lock said stationary member against rotation, said stationary member and said spindle-clamping means being movable relative to one another in a direction transverse to the plane of said support member; and means mechanically coupled to said support member for carrying a record disc in a plane that is substantially parallel to that of said support member and is spaced from said gears and said stationary member.

14. A record-playing speed-reducing adapter for a turntable of the non-rotatable central-spindle type comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member including an annular portion in engagement with the peripheral surfaces of said driven gears and a disc portion positioned below the plane of said annular portion; locking means positioned between said annular portion and said disc portion of said stationary member and coupled thereto, and including a spindle-clamping system for engagement with a non-rotatable central spindle associated with a turntable accommodating said adapter to lock said stationary member against rotation; and means mechanically coupled to said support member for carrying a record disc in a plane that is substantially parallel to that of said support member and is spaced from said gears and said stationary member.

15. A record-playing speed-reducing adapter for a turntable of the non-rotatable central-spindle type comprising: a support member having a central aperture for receiving a spindle to position the support member coaxially with a turntable; a plurality of similar driving gears rotatably supported by said member at equal radial distances from said aperture and positioned in planes normal to that of said member for engagement with a turntable accommodating said adapter; a plurality of similar driven gears having a smaller diameter than said driving gears, rotatably supported by said member at equal radial distances from said aperture, and mechanically coupled to said driving gears for rotation therewith; a stationary member including an annular portion in engagement with the peripheral surfaces of said driven gears and a disc portion positioned below the plane of said annular portion; locking means positioned between said annular portion and said disc portion of said stationary member and coupled thereto, and including a spindle-clamping system having a serrated member, a clamping lever and a spring biasing said lever toward said serrated member for engagement with a non-rotatable central spindle associated with a turntable accommodating said adapter to lock said stationary member against rotation; and means mechanically coupled to said support member for carrying a record disc in a plane that is substantially parallel to that of said support member and is spaced from said gears and said stationary member.

RALPH A. MULLANEY.

No references cited.